(12) United States Patent
Guinart et al.

(10) Patent No.: US 11,428,709 B2
(45) Date of Patent: Aug. 30, 2022

(54) METHOD FOR CALIBRATING A RADIAL-ACCELERATION SENSOR FOR THE WHEEL OF A MOTOR VEHICLE

(71) Applicants: Continental Automotive France, Toulouse (FR); Continental Automotive GmbH, Hannover (DE)

(72) Inventors: Nicolas Guinart, Toulouse (FR); Sébastien Plancke, Toulouse (FR); Jean-Philippe Boisset, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/264,138

(22) PCT Filed: Jul. 16, 2019

(86) PCT No.: PCT/EP2019/069139
§ 371 (c)(1),
(2) Date: Jan. 28, 2021

(87) PCT Pub. No.: WO2020/025315
PCT Pub. Date: Feb. 6, 2020

(65) Prior Publication Data
US 2021/0239731 A1 Aug. 5, 2021

(30) Foreign Application Priority Data

Jul. 30, 2018 (FR) ...................................... 1857075

(51) Int. Cl.
*G01P 21/00* (2006.01)
*B60C 23/04* (2006.01)
(Continued)

(52) U.S. Cl.
CPC .......... *G01P 21/00* (2013.01); *B60C 23/0488* (2013.01); *B60C 23/0489* (2013.01);
(Continued)

(58) Field of Classification Search
CPC .................................. G01P 21/00; G01L 17/00
See application file for complete search history.

(56) References Cited

U.S. PATENT DOCUMENTS 9,459,275 B2   10/2016   Guinart
2011/0307205 A1   12/2011   Vassilieff
(Continued)

FOREIGN PATENT DOCUMENTS

CN   103029536 A   4/2013
CN   104820114 A   8/2015
(Continued)

OTHER PUBLICATIONS

English translation of Written Opinion for International Application No. PCT/EP2019/069139, dated Aug. 23, 2019, 8 pages.
(Continued)

*Primary Examiner* — Walter L Lindsay, Jr.
*Assistant Examiner* — Andrew V Do
(74) *Attorney, Agent, or Firm* — RatnerPrestia

(57) ABSTRACT

A method for calibrating a radial acceleration sensor of a wheel of a vehicle including the following steps: acquisition, by the sensor, of signals $S_i$, each signal $S_i$ being acquired during a predetermined time window $W_i$ when the vehicle is in motion, the windows $W_i$ being different from one another; detection, for each time window $W_i$, of local extrema of the signal $S_i$ associated respectively with phase values and detection instants; determination, for each time window $W_i$, of a frequency $F_i$ of the rotation of the wheel of the vehicle as a function of the phase values and of the detection instants for the local extrema detected; low-pass filtering of the signals $S_i$, so as to obtain, for each time window $W_i$, a filtered value $Z_i$; calibration of a constant error $E_c$ of the radial acceleration sensor as a function of the filtered values $Z_i$ and of the frequencies $F_i$.

11 Claims, 2 Drawing Sheets

(51) Int. Cl.
*G01L 17/00* (2006.01)
*G01P 1/00* (2006.01)
*G01P 15/09* (2006.01)

(52) U.S. Cl.
CPC ............ *G01L 17/00* (2013.01); *G01P 1/00* (2013.01); *G01P 15/09* (2013.01)

(56) References Cited

U.S. PATENT DOCUMENTS

| 2013/0085710 | A1 | 4/2013 | Kautzsch |
| 2013/0211764 | A1 | 8/2013 | Steiner |
| 2015/0219683 | A1 | 8/2015 | Schueler |
| 2016/0091529 | A1 | 3/2016 | Dawson et al. |
| 2019/0070910 | A1* | 3/2019 | Guinart ............... G01P 15/08 |

FOREIGN PATENT DOCUMENTS

| CN | 103153656 B | 12/2015 |
| DE | 102012109307 A1 | 4/2013 |
| DE | 102013101438 A1 | 8/2013 |
| FR | 3043466 A1 | 5/2017 |
| JP | 2012179928 A | 9/2012 |
| WO | 2010099877 A1 | 9/2010 |

OTHER PUBLICATIONS

International Search Report and Written Opinion for International Application No. PCT/EP2019/069139, dated Aug. 23, 2019, with partial English translation, 9 pages.

International Search Report and Written Opinion for International Application No. PCT/EP2019/069139, dated Aug. 23, 2019, 13 pages (French).

* cited by examiner

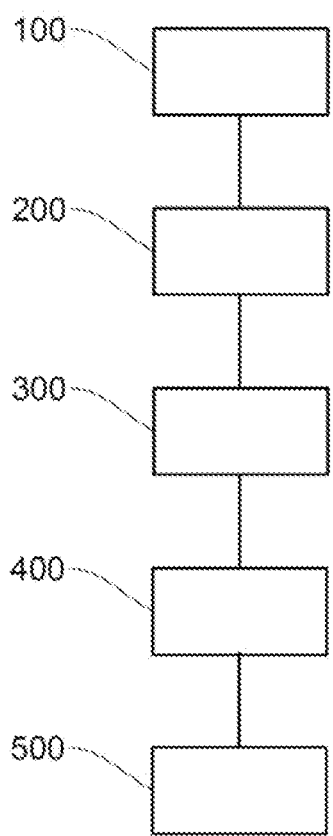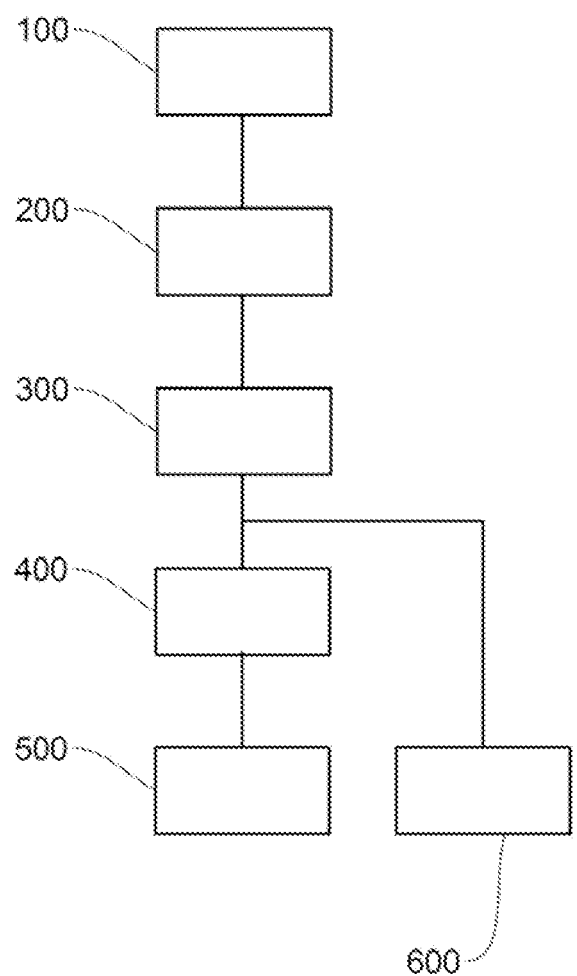

METHOD FOR CALIBRATING A RADIAL-ACCELERATION SENSOR FOR THE WHEEL OF A MOTOR VEHICLE

CROSS REFERENCE TO RELATED APPLICATIONS

This application is the U.S. National Phase Application of PCT International Application No. PCT/EP2019/069139, filed Jul. 16, 2019, which claims priority to French Patent Application No. 1857075, filed Jul. 30, 2018, the contents of such applications being incorporated by reference herein.

FIELD OF THE INVENTION

The present invention relates to the field of the measurement of physical parameters for a motor vehicle, such as a car for example, and relates more particularly to a method for calibrating a radial acceleration sensor for a wheel of a motor vehicle, and to a wheel unit configured for implementing such a calibration method.

BACKGROUND OF THE INVENTION

In order to improve driving safety, the current regulations require each newly produced motor vehicle to be equipped with a system for monitoring various physical parameters so as to be able to detect a malfunctioning of one or more elements that make up said motor vehicle. The parameters measured are typically the radial acceleration of at least one wheel of the vehicle, and also the pressure and temperature of the tire with which this wheel is equipped.

Conventionally, such a monitoring system comprises at least one electronic housing, also known as a "wheel unit", mounted on a wheel of the motor vehicle. For example, such a wheel unit collaborates fixedly with a valve of the rim with which the wheel is equipped. As a preference, each wheel of the vehicle is equipped with a wheel unit so as to monitor certain parameters across the entire vehicle.

The wheel unit comprises sensors dedicated respectively to measuring said parameters, such as, for example, a TPMS (Tire Pressure Monitoring System) sensor, dedicated to measuring the pressure in the tire. In addition to these sensors, the wheel unit also comprises a microprocessor, a battery, a memory and a radiofrequency transmitter. To supplement the wheel unit, the monitoring system also comprises a central unit with which the vehicle is equipped and which comprises an electronic computer incorporating a radiofrequency receiver connected to an antenna, this being so as to receive signals transmitted by the wheel unit and, where appropriate, to transmit alerts intended for the driver of the vehicle.

The functions executed by the wheel unit are very much dependent on the precision with which the radial acceleration of the wheel equipped by said wheel unit is measured. Specifically, and on the one hand, the battery fitted to the wheel unit has a limited life, typically of between 5 and 10 years. In order to preserve this battery life for as long as possible, the physical parameters, the temperature and the pressure of the tire in the example here, should be supervised only when the vehicle is in motion. As a result, if the radial acceleration measurement is erroneous and leads to a detection that the vehicle is in motion when in fact said vehicle is stationary, the battery of the wheel unit will be used are inappropriately. On the other hand, in the event that at least two wheels are respectively equipped with wheel unit, the precision with which the radial acceleration is measured plays a critical role in identifying which wheel is potentially afflicted by a lack of pressure.

It is known that a radial acceleration sensor has an error said to be "constant" (also referred to as error margin or origin offset errororr quite simply "offset"), which corresponds to an offset inherent to the technology employed and liable to affect the measurement precision. While the value of this constant error is estimated precisely during manufacture, it is nevertheless subject to significant drift over time, notably as a result of the ageing of the electronic components and as a result of the temperature variations and shocks it experiences.

Methods for calibrating the radial acceleration sensor have therefore been proposed, these in particular aiming to determine the constant error and to correct the radial acceleration measurements accordingly.

However, the methods of this type are confined to determining the constant error either when the motor vehicle is moving at a steady speed, that is to say at constant speed, or while the vehicle is moving at a variable speed but nevertheless carrying out calculations on the basis of a simplified model of the kinetic equations describing the change in radial acceleration (typically neglecting the sinusoidal components of the acceleration due to gravity and of the longitudinal acceleration respectively). Such simplified modelling ultimately amounts to considering a speed that is steady and non-variable. As a result, these methods lack precision because they rely on simplistic assumptions and/or cannot be implemented during nonspecific phases of travel of the vehicle.

Furthermore, as far as correcting the constant error is concerned, the most recent solutions employ an algorithm aimed at decrementing the radial acceleration measured when the vehicle is stationary, in constant steps, for example in steps of 0.5 g (where g represents the acceleration due to gravity on Earth). In the algorithm, the "stationary" criterion is that a zero radial acceleration has been reached. Such an approach is not optimal because it is excessively approximate. Specifically, implementation thereof relies on the assumption that the radial acceleration is zero when the vehicle is stationary, whereas in real life, this acceleration can adopt a value of between −1 g and +1 g according to the exact position of the radial acceleration sensor in the wheel (the maximum of +1 g [and respectively the minimum of −1 g] being reached when said sensor is at the top [or respectively at the bottom] of the wheel, the radial acceleration measured being centripetal). Thus, this assumption results in the introduction of a measurement error, which is furthermore modulated by the step size of the algorithm, which mars the determination of the constant error, and therefore affects the precision of the measurement by the radial acceleration sensor.

SUMMARY OF THE INVENTION

An aspect of the present invention aims to overcome all or some of the disadvantages of the prior art, particularly those set out hereinabove, by proposing a solution that makes it possible to calibrate effectively a radial acceleration sensor of a wheel of a motor vehicle, in particular by determining very precisely the constant error of said radial acceleration sensor. A solution of this type makes it possible to calibrate the radial acceleration sensor from measurements acquired when the vehicle is in motion independently of its speed of travel, and without making the assumption of zero radial acceleration when the vehicle is stationary. An aspect of the invention also proposes a solution that provides a wheel unit comprising a radial acceleration sensor and configured to calibrate the latter effectively.

To this end, and in a first aspect, the invention relates to a method for calibrating a radial acceleration sensor of a wheel of a motor vehicle. Furthermore, said calibration method comprises the following steps:

- an acquisition step of acquisition, by the radial acceleration sensor, of signals $S_i$, each signal $S_i$ being acquired during a predetermined time window $W_i$ when the vehicle is in motion, the windows $W_i$ being different from one another,
- a detection step of detecting, for each time window $W_i$, at least three local extrema of the signal $S_i$ which are respectively associated with phase values and with detection instants,
- a determination step of determining, for each time window $W_i$, a frequency $F_i$ of the rotation of the wheel of the vehicle as a function of the phase values and of the detection instants for the local extrema detected in said time window $W_i$,
- a filtering step of low-pass filtering of the signals $S_i$, so as to obtain, for each time window $W_i$, a filtered value $Z_i$ associated with the frequency $F_i$,
- a calibration step of calibrating a constant error $E_c$ of the radial acceleration sensor as a function of the filtered values $Z_i$ and of the frequencies $F_i$.

In particular embodiments of the invention, the calibration method may further comprise one or more of the following features, taken alone or in any technically possible combination.

In one particular embodiment, the step of determining the frequency $F_i$ comprises, for each time window $W_i$ considered, determining a phase time signal $\varphi_i$ by quadratic interpolation of the respective phase values of three local extrema, the frequency $F_i$ being determined by evaluating the derivative of said signal $\varphi_i$ with respect to time at a predetermined instant $t_p$ within said time window $W_i$.

In one particular embodiment, the three local extrema considered within each time window $W_i$ are consecutive.

In one particular embodiment, the cut-off frequency of the low-pass filter applied to the signals $S_i$ is less than or equal to 10 Hz, preferably less than 5 Hz, and more preferably still equal to 1 Hz.

In one particular embodiment, the step of estimating the constant error $E_c$ comprises a linear regression of points $P_i$, each point $P_i$ having $Z_i$ and $F_i^2$ as its ordinate and abscissa values respectively, the constant error $E_c$ being estimated to be equal to the ordinate value at the origin of said linear regression.

In one particular embodiment, said method comprises, after the detection step, a step of estimating, for at least one time window $W_i$, an error in the gain $R_i$ of the radial acceleration sensor according to the formula:

$$R_i = V_i / Q_i,$$

where $V_i$ represents an amplitude associated with at least one local extremum of the signal $S_i$ acquired during said at least one time window $W_i$, and $Q_i$ represents an amplitude that is expected on the basis of measurements theoretically supplied by the radial acceleration sensor for said at least one local extremum, the gain error $R_i$ being calculated only if a steady-speed phase is detected for the signal $S_i$.

In one particular embodiment, when a phase time signal $\varphi_i$ is determined in accordance with an aspect of the invention, the step of estimating a gain error comprises, for each time window $W_i$, making a comparison between the second derivative of the phase time signal $\varphi_i$ and a predetermined value $\varepsilon$, such that if $$|d^2\varphi_i/dt^2| < \varepsilon,$$

a steady-speed phase is detected.

In one particular embodiment, the amplitude $V_i$ corresponds to the amplitude between two consecutive local extrema of the signal $S_i$ in a steady-speed phase, and $Q_i$ satisfies:

$$Q_i = 2 \times g \times G,$$

where g is the acceleration due to gravity, and G represents the gain of a filter applied to the signal $S_i$ during the detection step so as to reduce measurement noise.

According to a second aspect, the present invention relates to a wheel unit comprising a radial acceleration sensor. Furthermore, said wheel unit comprises means configured to implement the steps of the calibration method according to an aspect of the invention, so as to calibrate said radial acceleration sensor.

According to a third aspect, the present invention relates to a motor vehicle comprising a wheel unit according to an aspect of the invention.

BRIEF DESCRIPTION OF THE DRAWINGS

An aspect of the invention will be better understood upon reading the following description, given by way of entirely non-limiting example and with reference to FIGS. 1 to 4, in which:

FIG. 2: is a flow diagram of one exemplary embodiment of a method for calibrating a sensor for the radial acceleration of the wheel of the vehicle.

FIG. 4: is a flow diagram of one preferred embodiment of the method of FIG. 2 in which the method comprises a step of estimating an error in the gain of said sensor.

In these figures, references that are identical from one figure to the next denote identical or analogous elements. For the sake of clarity, the elements shown are not to scale, unless indicated otherwise.

DETAILED DESCRIPTION OF THE PREFERRED EMBODIMENTS

An aspect of the present invention relates to the field of the measurement of the radial acceleration of a wheel of a motor vehicle, such as a car for example. Conventionally, the units of measurement for radial acceleration are $m \cdot s^{-2}$.

Figure 1:
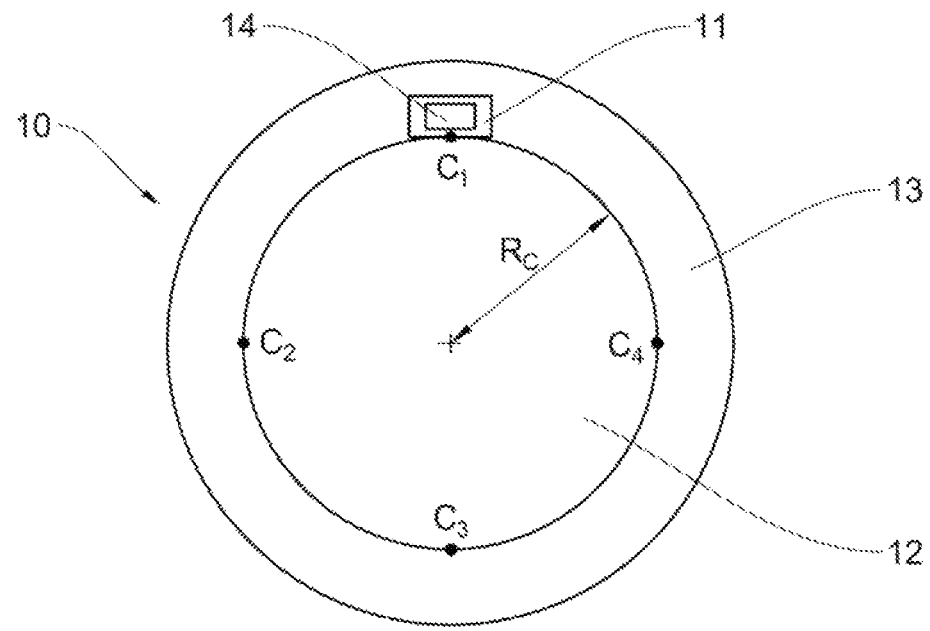
FIG. 1: is a schematic depiction of a wheel of a motor vehicle.

FIG. 1 schematically depicts a wheel 10 of a motor vehicle.

The motor vehicle (not depicted in the figures) is equipped with a tire pressure monitoring system. Said monitoring system in the conventional way comprises a central electronic unit (not depicted in the figures) arranged inside the vehicle and, on each of the wheels of said vehicle, a wheel unit 11. Without this detracting from the generalized nature of an aspect of the invention, the next part of the description seeks more specifically to detail the operation of a single wheel unit 11, it being appreciated that the explanation given clearly applies, without distinction, to each wheel unit 11 of the vehicle.

The next part of the description considers the configuration in which the wheel unit 11 is attached to the end of the valve of the rim 12 of the wheel 10, for example using a "snap-in" type of connection known to those skilled in the art and so that it is arranged inside the tire 13 with which the wheel 10 is equipped. However, there is nothing to prevent there being a wheel unit 11 attached to the valve of the rim 12 of the wheel 10 in a different way, for example secured by a nut and of "clamp-in" type, or else attached to the rim 12 of the wheel 10 directly, for example using a metal band known per se, by screw-fastening, by bonding, etc.

The wheel unit 11 comprises a radial acceleration sensor 14 configured to take measurements of the radial acceleration of the wheel 10. By way of entirely nonlimiting example, said radial acceleration sensor 14 is of the microelectromechanical system (also known as MEMS) type, for example a piezoelectric accelerometer known per se. However, there is nothing to prevent there being, in other examples not detailed here, a radial acceleration sensor 14 of some other known type.

FIG. 2 is a flow diagram of one exemplary embodiment of a method for calibrating the sensor 14 for the radial acceleration of the wheel 10 of the vehicle.

For example, for the implementation of said calibration method, the wheel unit 11 comprises a processing circuit (not depicted in the figures) comprising one or more processors and storage means (magnetic hard disk, electronic memory, optical disk, etc.) on which a computer program product is stored, in the form of a set of program code instructions to be executed in order to implement the various steps of the method for calibrating the radial acceleration sensor 14. Alternatively, or in addition, the processing circuit of the wheel unit 11 comprises one or more programmable logic circuits (FPGA, PLD, etc.), and/or one or more specialized integrated circuits (ASIC), and/or a set of discrete electronic components, etc., suitable for implementing all or some of said steps of the method for calibrating the radial acceleration sensor 14.

In other words, the processing circuit of the wheel unit 11 comprises a set of means which are configured in the form of software (specific computer program product) and/or hardware (FPGA, PLD, ASIC, discrete electronic components, etc.) to implement the steps of the method for calibrating the radial acceleration sensor 14.

In one particular embodiment, and entirely nonlimitingly, the wheel unit 11 comprises, in addition to the memory storage means and a radial acceleration sensor 14, also a microprocessor, a battery and a radiofrequency transmitter, as well as temperature and pressure sensors respectively. As for the central unit of the monitoring system, this comprises an electronic computer incorporating a radiofrequency receiver connected to an antenna, this being so as to receive signals transmitted by the wheel unit 11 and, where appropriate, to transmit alerts intended for the driver of the vehicle. Typically, the central unit is configured to transmit alerts when the inflation pressure of a tire 13 drops below a predetermined threshold, thus informing a user of the vehicle of the need to provide additional inflation, or even potentially to replace said tire 13.

The method for calibrating the radial acceleration sensor 14 comprises several steps. In outline, said method consists first of all in obtaining measurements taken by said sensor 14 during a plurality of time windows. A frequency of rotation of the wheel 10 is determined for each time window as a function of said measurements. Thereafter, a constant error $E_c$ of the radial acceleration sensor 14 is determined as a function of the frequency of rotation of the wheel 10 and of filtered values of said radial acceleration measurements. By comparison with the prior art, said method has the objective of allowing a more refined estimate of the constant error $E_c$ of the radial acceleration sensor 14, the improvement in said estimate being conditional here on determining the frequency of rotation of the wheel 10 precisely, whatever the speed of travel of the vehicle.

To this end, the calibration method comprises, first of all, an acquisition step 100 of acquisition, by the radial acceleration sensor 14, of signals $S_i$, each signal $S_i$ being acquired during a predetermined time window $W_i$ when the vehicle is in motion.

In the conventional way, the radial acceleration sensor 14 acquires the signals in analog form. The next part of the description adopts the convention whereby the radial acceleration of the wheel 10 is measured according to a radial axis connecting the sensor 14 to the axis of rotation of the wheel 10 and oriented centripetally. According to such a convention, and after projection onto said radial axis, it is known that a radial acceleration signal is, during the course of a time window, the sum of three components:

so-called "mean" component due to the centripetal force exerted on the radial acceleration sensor 14 and equal to:

$R \times \omega^2$, where R denotes the distance separating the axis of rotation of the wheel 10 from the radial acceleration sensor 14 (and hence from the wheel unit 11, to a first approximation) and w denotes the angular velocity of the wheel 10;

a so-called "gravitational" component due to the force of gravity exerted on the radial acceleration sensor 14 and equal to:

$g \times \sin(\omega \times (t-t_0) + \varphi(t_0))$, where g represents the acceleration due to gravity, $t_0$ denotes a reference instant in the time window considered, and $\varphi(t_0)$ denotes the initial phase of the signal;

a so-called "longitudinal" component due to the thrust or braking force experienced by the vehicle as it travels, and equal to:

$\gamma \times \sin(\omega \times (t-t_0) + \varphi(t_0))$, where $\gamma$ denotes the amplitude of the thrust or braking force. Thus, when the vehicle is running at a steady speed, that is to say at constant speed, the longitudinal component is zero.

It should be noted that, as it moves, the wheel 10 of the vehicle may be subjected to vertical movements, that is to say movements oriented in the field of gravity, notably according to the condition of the road (bumps, potholes, etc.). This vertical movement is thus associated with a vertical acceleration component which is not, however, taken into consideration in the breakdown given above for the projection of the radial acceleration signal onto the radial axis. Specifically, because the condition of the road is not known in advance, it is not possible to model the corresponding vertical acceleration in a deterministic manner. Nevertheless, because the vertical movements caused by the condition of the road remain fleeting, they therefore do not affect the validity of the results obtained hereinafter.

As the vehicle moves along, the wheel unit 11, and therefore ultimately the radial acceleration sensor 14, follows the movement of the wheel 10. Specifically, and as illustrated in FIG. 1, the wheel unit 11 will, during the course of a complete revolution of the wheel 10, notably occupy four distinct positions, referred to as extremal positions, and denoted $C_1$, $C_2$, $C_3$ and $C_4$. They respectively correspond to the top, left, bottom and right extreme positions. Thus, when the radial acceleration sensor 14 is in position $C_2$ or $C_4$, the amplitude of the longitudinal component is, in terms of absolute value and when the vehicle is indeed in the process of accelerating, at a maximum, whereas that of the gravitational component is zero. Conversely, when the radial acceleration sensor 14 is in position $C_1$ or $C_3$, the amplitude of the gravitational component is, in terms of absolute value, at a maximum, whereas that of the longitudinal component is zero. It will be appreciated therefore that the values of the radial acceleration fluctuate around the mean component according to the values respectively adopted by the gravitational and longitudinal components.

Figure 3:
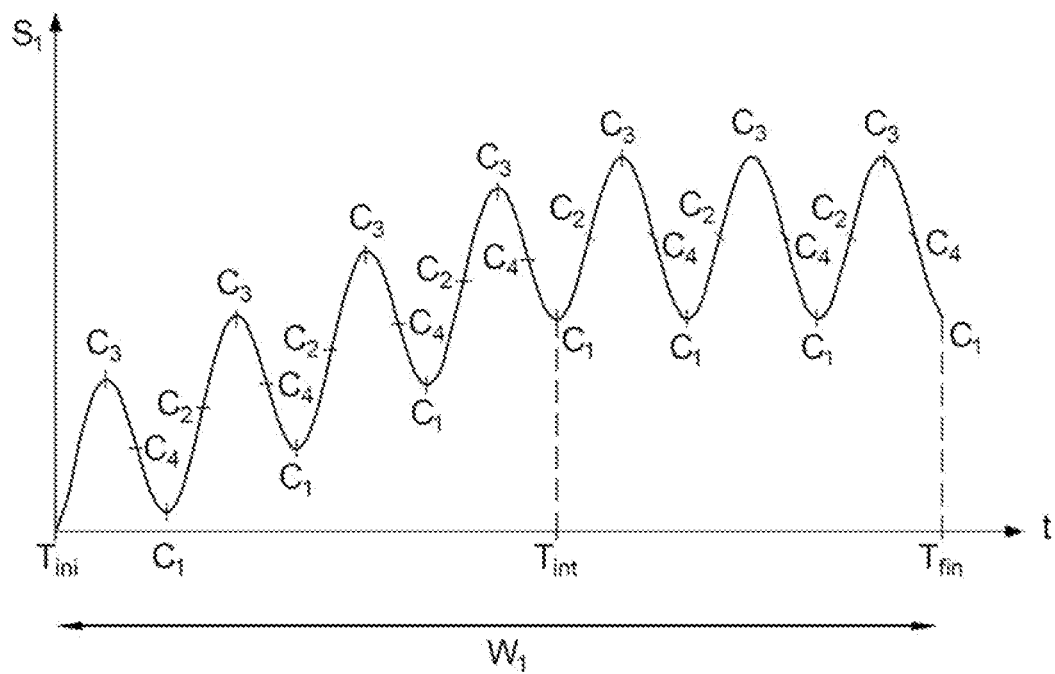
FIG. 3: is a curve representing one example of a signal $S_1$ acquired by the radial acceleration sensor during a time window $W_1$.

FIG. 3 is a curve representing one example of a signal $S_1$ acquired by the radial acceleration sensor 14 during a time window $W_1$. In the example of FIG. 3, the signal $S_1$ is represented in a diagram which, on the abscissa axis, indicates the time measured in seconds and, on the ordinate axis, indicates the value of the radial acceleration, measured in $m \cdot s^{-2}$. Acquisition of the signal $S_1$ begins at an instant $T_{ini}$ considered here, arbitrarily and entirely nonlimitingly, as being the time origin of the diagram. The final acquisition instant is denoted $T_{fin}$, such that the time window $W_1$ corresponds to the interval $[T_{ini}, T^{fin}]$. In this example, the signal $S_1$ comprises first of all a first phase corresponding to a movement of the vehicle at a variable speed, from the initial instant $T_{ini}$ as far as an intermediate instant $T_{int}$. During this first phase, the vehicle is running at a speed for which the mean component of the radial acceleration is increasing, which means that its speed is increasing. From $T_{int}$ onwards, and up to $T_{fin}$, the signal $S_1$ comprises a second phase corresponding to the vehicle moving at a steady speed. During this second phase, the mean component of the radial acceleration and the longitudinal component are respectively constant and zero, such that the vehicle is running at constant speed. Furthermore, the points $C_1$, $C_2$, $C_3$ and $C_4$, which correspond to said extremal positions, are indicated periodically in FIG. 3, according to the revolutions performed by the wheel 10.

It should be noted that the curve $S_1$ illustrated in FIG. 3 is given purely by way of nonlimiting example. Thus, a signal acquired by the radial acceleration sensor 14, although it always exhibits fluctuations about the mean component, may comprise one or more phases of, respectively, steady speed or variable speed (corresponding to an increase or alternatively to a decrease in the speed of the vehicle), and these may occur in any order. Furthermore, it is important to point out that the signals exploited in the later steps of the calibration method, which steps are described hereinafter, are therefore not limited to a steady speed of the vehicle. On the contrary, said method is implemented for radial acceleration signals independently of the speed of travel of the vehicle.

During step 100, at least two signals $S_i$ are acquired during respective time windows $W_i$, said windows $W_i$ being different from one another. The expression "different from one another" refers here to the fact that said windows $W_i$ are not fully superposed. In other words, two time windows are either successive, or partially overlap one another. Such an approach makes it possible to avoid redundancy in the execution of the calibration method.

The next part of the description adopts the convention whereby the vehicle is configured to run at a speed of between 20 km/h and 150 km/h. Such a speed range corresponds to a frequency of rotation of the wheel 10 of between 3 Hz and 25 Hz. As a result, each time window $W_i$ is chosen so as to allow the acquisition of a signal $S_i$ for a duration suitable for detecting local extrema, as described hereinafter. For example, the duration of each time window $W_i$ is between 80 ms and 700 ms. However, there is nothing to prevent the duration of a time window $W_i$, in other examples not detailed here, from being chosen outside of the interval [80 ms, 700 ms], it being within the competence of the person skilled in the art to parameterize such a duration according to the range of speeds of the vehicle.

In one preferred embodiment, the time windows $W_i$ are distinct by pairs. In other words, the time windows $W_i$ are successive and have no instant in common. This approach is advantageous because it allows the acquisition of signals that are sufficiently distinct from one another. The expression "sufficiently distinct from one another" refers here to the fact that the signals $S_i$ cover a broad range of radial accelerations. For example, the signals $S_i$ respectively correspond to radial acceleration values substantially equal to 20 g, 100 g, 200 g, 300 g, etc.

However, there is nothing to prevent the time windows $W_i$ from being configured differently. For example, and by way of alternative, the time windows $W_i$ are consecutive. Since each time window defines a duration between a start instant and an end instant, said time windows are therefore configured in such a way that the end instant of one time window is equal to the start instant of another time window.

Note that the acquisition step 100 is conditional upon said vehicle being in motion. In one exemplary embodiment, the acquisition step 100 is executed just once per driving cycle. The expression "driving cycle" refers here to a cycle beginning, for example, once the vehicle has been driving for at least one minute at a speed greater than 20 km/h and ending, for example, once the vehicle has been stationary for at least 15 minutes. However, there is nothing to prevent a driving cycle being defined, in other examples not detailed here, by other parameters. Alternatively, the step 100 is executed for example periodically after a predetermined number of driving cycles, for example every five driving cycles.

The calibration method then comprises a detection step 200 of detecting, for each time window $W_i$, at least three local extrema of the signal $S_i$.

In one particular embodiment, the detection of the local extrema within each time window $W_i$ involves first of all sampling the signals $S_i$ respectively associated with said windows $W_i$. For example, each signal $S_i$ is sampled at a frequency greater than 500 Hz, for example equal to 2 kHz. However, there is nothing to prevent sampling, in other embodiments not detailed here, at a frequency greater than 2 kHz. To this end, it is within the competence of a person skilled in the art to implement the electronics necessary for sampling at a desired frequency, within the design and cost limitations prescribed by the technical specifications of the manufacture of the wheel unit 11.

Note that the expression "local extremum" refers here to the fact that the criterion of representing a maximum (or else a minimum) that a sample of a signal has to meet in order for this sample to be considered to be an "extremum" is defined in relation to a detection window around said sample.

For example, a detection window for a given sample is defined as being the set encompassing the five samples preceding said given sample, as well as the five samples succeeding said given sample. It is within the competence of a person skilled in the art to choose a suitable size of detection window to be considered, so as to ensure precise detection of the local extrema of a signal.

As a preference, each sampled signal $S_i$ is then filtered in order to remove the measurement aberrations caused, for example, by poor conditions of driving of the vehicle. Filtering the signals $S_i$ in this way makes it possible to avoid detecting local extrema amongst the noise that might be affecting the measurements from the radial acceleration sensor 14. For example, a low-pass filter is applied to the signals $S_i$, the cut-off frequency of said filter preferably being equal to 200 Hz. However, there is nothing to prevent other types of filter with different cut-off frequencies being applied, depending on the information that is to be sought out and isolated in the signals $S_i$.

Once the signals $S_i$ have been sampled, and, where appropriate, filtered, the local extrema are detected in a way known per se, for example using a sliding detection window perusing the time windows $W_i$ associated with said signals $S_i$. In other words, this is a matter of perusing the time series of the samples and of detecting the local extrema therein.

As described above, each signal S fluctuates about its mean component. It will be appreciated therefore that the local extrema of a signal $S_i$ correspond to the radial acceleration values acquired at the extremal positions $C_1$ and $C_3$, namely when the gravitational component of the radial acceleration is at a maximum in terms of absolute value. Thus, in the present exemplary embodiment, the local extrema of a signal $S_i$ are respectively associated with detection instants corresponding to the instants at which the radial acceleration sensor 14 occupies either a position $C_1$, or a position $C_3$. These detection instants are also stored in memory by the memory storage means of the wheel unit 11 while waiting to be processed during later steps in the calibration method.

In addition, said local extrema are also respectively associated with phase values corresponding to the values of phases of said positions $C_1$ and $C_3$. In other words, the difference between the respective phases of two consecutive local extrema of a signal $S_i$ is equal to $\pi$. More generally, the difference between the respective phases of any two extremal positions $C_1$ and $C_3$ of a signal $S_i$ is a multiple of $\pi$.

The next part of the description adopts the convention whereby, for one revolution of a wheel 10, the phase values of the local extrema corresponding to the extremal positions $C_1, C_2, C_3$ and $C_4$ are respectively equal to 0, $\pi/2$, $\pi$, $3\times\pi/2$. After one revolution of a wheel 10, the phase value for a local extremum corresponding to the position $C_1$ is equal to $2\times \pi$ (also denoted "$2\pi$"), etc.

It is important to note that the act of seeking the local extrema of the signals $S_i$ rather than considering other samples at random is advantageous because it allows them to be characterized reliably via their respective detection instants and phase values. Specifically, the local extrema of a signal $S_i$ correspond to the only samples for which it is possible to attribute a known respective phase value. Away from these local extrema, it is not possible to determine the phase value of a sample.

Thus, at the end of step 200, each local extremum of a signal $S_i$ is associated with a phase value and with an instant of detection within the time window $W_i$.

At the end of said step 200, the calibration method comprises a determination step 300 of determining, for each time window $W_i$, a frequency $F_i$ of the rotation of the wheel 10 of the vehicle as a function of the phase values and of the detection instants for the local extrema detected in said time window $W_i$.

Adopting this approach for determining a frequency $F_i$ is particularly advantageous because it makes it possible to obtain a very precise value which takes account of the dynamics of the wheel 10, and to do so whatever the speed of travel of the vehicle.

In one particular embodiment, for each time window $W_i$ considered, a phase time signal $\varphi_i$ is determined by quadratic interpolation of the respective phase values of three local extrema detected during the preceding step 200. Said time signal $\varphi_i$ therefore corresponds, from a mathematical viewpoint, to a continuous function of which the argument is time.

As an entirely nonlimiting illustration of an example of quadratic interpolation, consider, within a time window $W_i$, three local extrema, respectively associated with the phase values 0, $\pi$ and $2\pi$. These phase values correspond respectively to the detection instants denoted $t_0$, $t_1$ and $t_2$. The phase signal $\varphi_i$ is sought in the form:

$$\varphi_i(t)=A\times(t-t_0)^2+B\times(t-t_0),$$

where A and B are constants. The constants A and B are determined in the conventional way by solving a system of two equations with two unknowns. This system can be written:

$$\varphi_i(t_1)=\pi, \text{ and } \varphi_i(t_2)=2\pi,$$

yielding respectively:

$$A = \pi \times \frac{2 - \frac{t_2 - t_0}{t_1 - t_0}}{t_1 \times t_2 \times \left(\frac{t_2 - t_0}{t_1 - t_0}1\right)} \text{ and } = \pi \times \frac{(t_2 - t_0)^2 - 2 \times (t_1 - t_0)^2}{t_1 \times t_2 \times (t_2 - t_1)}.$$

Using these calculations, it may be seen that when the duration $t_2-t_0$ is equal to twice the duration $t_1-t_0$, the coefficient A is zero. That corresponds to the situation in which the signal $S_i$, from which the local extrema are extracted, is a sinusoid, namely that the vehicle is traveling at a constant speed and that the phase signal is an affine function of time.

By contrast, when the duration $t_2-t_0$ is not equal to twice the duration $t_1-t_0$, namely when the vehicle is traveling at a variable speed, it will then be appreciated that seeking a quadratic interpolation of the phase advantageously allows a more refined estimate of how the phase signal $\varphi_i$ changes with respect to time. Specifically, in this type of condition, the change in phase signal $\varphi_i$ with respect to time is no longer linear.

As a result, one advantage associated with the fact of performing a quadratic interpolation of the local extrema detected in a time window $W_i$ is that it makes it possible to obtain a phase signal $\varphi_i$ representative of any type of speed of travel of the vehicle, namely both when the speed is steady and when it is variable.

It will also be noted that determining the phase signal $\varphi_i$ according to this embodiment requires very little calculation, and can therefore be executed very quickly. Specifically, said quadratic interpolation is determined by the calculation of said coefficients A and B. Now, these calculations are based solely on algebraic operations using the detection instants, more specifically the durations $t_1-t_0$ and $t_2-t_0$. Therefore, the execution of this type of calculation does not require the wheel unit 11 to have a complex electronic architecture, and this simplifies the design of said unit.

The form in which the phase signal $\varphi_i$ is sought, which is the form indicated hereinabove, corresponds to a configuration in which the phase of the signal $S_i$ acquired in the time window $W_i$ is considered to be zero at the instant $t_0$. This then is a convention adopted in order to simplify the description of an aspect of the present invention. Thus, there is nothing to prevent having, in other embodiments not detailed here, a local extremum associated with a detection instant $t_0$ and for which the value of the phase is a multiple of $\pi$. In that case, it is within the competence of a person skilled in the art to determine the form in which to seek said quadratic interpolation.

It will also be noted that, in order to implement said particular embodiment, the local extrema of the time window considered are consecutive. Adopting that approach advantageously makes it possible to interpolate phase values that are not very widely spaced in time, namely that are obtained from a restricted number of revolutions of the wheel 10, for example typically two revolutions of the wheel 10. In this way, it is possible quickly to obtain a phase signal, without having to wait for numerous revolutions of the wheel 10, this being something that is better suited to determining a frequency representative of a particular speed at which the vehicle is traveling.

However, according to other embodiments, there is nothing to prevent a phase time signal $\varphi_i$ from being determined by quadratic interpolation of non-consecutive local extrema. Insofar as the interpolation sought is a degree two polynomial function, the only condition imposed is that of having three interpolation (and namely therefore three extrema) values available. In general, whatever the local extrema considered, one example of quadratic interpolation is to determine the Lagrange polynomial that passes through these local extrema.

In addition, the inventors have found that seeking the phase signal ci in the form of a degree two polynomial function made it possible to obtain a good approximation, and therefore sufficient precision for determining a frequency $F_i$ associated with the time window. However, there is nothing to prevent the phase signal $\varphi_i$ from being determined by means of a polynomial regression of degree higher than two, or else again by means of a piecewise polynomial function interpolation, for example using splines.

Once the phase signal $\varphi_i$ has been determined for each time window $W_i$, said frequency $F_i$ is determined in its turn by evaluating the derivative of said signal $\varphi_i$ with respect to time at a predetermined instant $t_p$ within said time window $W_i$.

For example, when the phase signal $\varphi_i$ is determined by quadratic interpolation in the form:

$$\varphi_i(t) = A \times (t-t_0)^2 + B \times (t-t_0),$$

the frequency $F_i$ is given by the formula:

$$F_i = \frac{1}{2\pi} \times \frac{d\varphi_i(t)}{dt}(t_p) = \frac{1}{\pi} \times \left[ A \times (t_p - t_0) + \frac{B}{2} \right].$$

Therefore, the act of determining the phase signal $\varphi_i$ very precisely (by comparison with a simple linear approximation) makes it possible to obtain a very precise value for the frequency of rotation of the wheel 10 at a predetermined instant to. This frequency is also determined whatever the speed of travel of the vehicle.

In one exemplary embodiment, each time window $W_i$ comprises a start instant and an end instant, the instant $t_p$ being equal to the end instant of the time window $W_i$ concerned. Note that such an instant $t_p$ does not necessarily correspond to an instant of detection of a local extremum in the time window Wi. This is why determining the phase signal $\varphi_i$ in the form of a function according to an aspect of the invention allows very precise evaluation of the frequency $F_i$ at this instant $t_p$. However, there is nothing to prevent some other arbitrary instant $t_p$ within a time window Wi being considered in order to evaluate the phase signal $\varphi_i$ and therefore also the frequency $F_i$.

Thus, at the end of step 300, each time window Wi is associated with a frequency $F_i$ of rotation of the wheel 10 of the vehicle. Furthermore, each frequency $F_i$ is associated with a phase value and with a predetermined instant $t_p$ in said time window $W_i$.

The calibration method next comprises a step 400 of low-pass filtering of the signals $S_i$, so as to obtain, for each time window $W_i$, a filtered value $Z_i$ associated with the frequency $F_i$.

The objective of this step is to isolate, first of all, an estimate of the low-frequency value of the radial acceleration, namely therefore an estimate of the mean component of each signal $S_i$. In a way known per se, such a filtering step is performed either in an analog or else in a digital manner.

In one particular embodiment, the cut-off frequency of the low-pass filter applied to the signals $S_i$ is less than or equal to 10 Hz, preferably less than 5 Hz, and more preferably still equal to 1 Hz.

As a preference, said cut-off frequency is less than 5 Hz, and more preferably still equal to 1 Hz, so as to effectively limit the contributions of the sinusoidal components of each signal $S_i$. However, there is nothing to prevent low-pass filtering, in other embodiments not detailed here, being carried out with a cut-off frequency of a different value. The choice of a particular value for the cut-off frequency conventionally depends on the trade-off between the desired precision and the associated operating cost (this cost being linked in with the complexity of the electronics carried on board the wheel unit 11).

Once a signal S has been filtered, and in a second stage, said filtered value $Z_i$ is obtained by considering the value of said filtered signal at the instant $t_p$ at which the frequency $F_i$ was determined during step 300.

In one preferred implementation, the low-pass filtering step 400 is executed in parallel with the step 300 of determining the frequencies $F_i$. For example, when the phase signal $\varphi_i$ is determined in the form of a function as described hereinabove, it will be appreciated that a filtered value $Z_i$ is associated with a frequency $F_i$ because of the fact that this value and this frequency are both obtained while considering the one same instant $t_p$ within the corresponding time window Wi. Executing step 400 in parallel with step 300 advantageously allows the calibration method according to an aspect of the invention to be more efficient, notably from the execution time standpoint.

Thus, at the end of the filtering step 400, each frequency $F_i$ in a time window $W_i$ is associated with a filtered value $Z_i$.

The calibration method next comprises a step 500 of calibrating a constant error $E_c$ of the radial acceleration sensor 14 as a function of the filtered values $Z_i$ and of the frequencies $F_i$.

It should be noted that the constant error $E_c$ of the radial acceleration sensor 14 is inherent to the sensor 14 itself and not dependent on the dynamics of the frequency of rotation of the wheel 10, namely on the derivative with respect to time of the frequency of rotation of the wheel 10.

In order to understand the way in which the values $Z_i$ can be linked to the frequencies $F_i$, it is necessary first to consider the hypothesis of a radial acceleration sensor 14 taking perfect measurements, that is to say measurements not including, in particular, any constant error $E_c$. According to this hypothesis, the theoretical relationship connecting the mean component of the radial acceleration to the frequency of rotation of the wheel 10 can be obtained by writing the angular velocity ω of the wheel 10 as being equal to the frequency of rotation of the wheel 10 multiplied by 2π. That being the case, in practice, the radial acceleration sensor 14 is unable to take perfect measurements. As a result, it is possible to model the relationship between the mean component of the radial acceleration and the frequency of rotation of the wheel 10, using the values determined during the course of the preceding steps, according to the following formula:

$$Z_i = K \times F_i^2 + E_c,$$

where K is a constant.

What this means is that the value of the constant error is fundamentally dependent on the frequencies $F_i$ of rotation of the wheel 10, so that the more precisely the frequencies $F_i$ are determined, the more precise will be the estimate of the constant error $E_c$ itself. Therefore, the method according to an aspect of the invention makes it possible to obtain a precise value for the constant error $E_c$, on the basis of refined estimates of the frequencies $F_i$, and to do so without assuming zero radial acceleration when the vehicle is stationary.

Thus, in one particular embodiment, the estimate of the constant error $E_c$ comprises a linear regression of points $P_i$, each point $P_i$ having $Z_i$ and $F_i^2$ as its ordinate and abscissa values respectively, the constant error $E_c$ being estimated to be equal to the ordinate value at the origin of said linear regression. In other words, the constant error $E_c$ is estimated to be equal to the ordinate value at the origin of the linear regression of the points $P_i$. Such an embodiment is particularly advantageous because the frequencies $F_i$ have been determined independently of the speed of travel of the vehicle. A direct result of this is that the estimating of the constant error $E_c$ is not dependent on said speed either.

By way of entirely nonlimiting example, consider two signals $S_1$ and $S_2$ acquired during step 100 and over the course of two time windows $W_1$ and $W_2$ respectively. Said signals $S_1$ and $S_2$ are respectively associated with frequencies $F_1$ and $F_2$, each frequency being calculated at the final instant of the time window concerned. Furthermore, each of the signals $S_1$ and $S_2$ is filtered in order to obtain low-frequency values $Z_1$ and $Z_2$ respectively, likewise at the instants marking the end of the associated time windows. The constant error is then estimated by performing a linear regression of the points $P_1(Z_1, F_1^2)$ and $P_2(Z_2, F_2^2)$. It will be noted that, in this example, this linear regression corresponds in fact to a linear interpolation insofar as there are only two points involved. The constant error $E_c$ is thus obtained by solving a system of two equations with two unknowns. This system can be written:

$$Z_1 = K \times F_1^2 + E_c, \text{ and } Z_2 = K \times F_2^2 + E_c,$$

yielding:

$$E_C = Z_1 - \frac{Z_2 - Z_1}{F_2^2 - F_1^2} \times F_1^2.$$

However, there is nothing to prevent the constant error $E_c$ from being estimated using a linear regression involving more than two points $P_i$. Specifically, it will be appreciated that the greater the number of points $P_i$ envisioned, the more precisely the constant error can be estimated. Nevertheless, the inventors have found that it is already possible to obtain excellent results with just two points $P_i$. Conventionally, the number of points $P_i$ that can be used for performing a linear regression is dependent on the storage capacity of the memory storage means of the wheel unit 11.

It should be noted that the linear regression performed during step 500 is of relevance as soon as at least two signals $S_i$ have been acquired by the radial acceleration sensor 14. For example, the linear regression is performed on the basis of three points $P_i$. These three points $P_i$ may have been freshly acquired, namely have never yet been used for determining a linear regression.

Alternatively, said three points $P_i$ comprise:
  two points that have already been used for determining a previous linear regression and recorded in a memory of the wheel unit 11. Recording a point $P_i$ in a memory of the wheel unit 11 here corresponds to recording characteristic data of said point $P_i$, namely $Z_i$, $F_i$ and the associated detection instant;
  a third point $P_i$ freshly determined during the course of the calibration method according to an aspect of the invention.

In this way, the constant error $E_c$ is estimated dynamically at any moment while the vehicle is driving, for example after each acquisition of a signal $S_i$ by the radial acceleration sensor 14.

In one particular embodiment, steps 100 to 500 are iterated during a driving cycle. Such an approach is advantageous because it allows the estimate of the constant error $E_c$ to be continually updated. Specifically, said constant error $E_c$ varies with the ageing of the electronics of the wheel unit 11 and/or as a function of the influence of the characteristics of the environment to which said wheel unit 11 is subjected, such as repeated shocks or significant temperature variations, etc. It is therefore advisable for the estimate of the constant error $E_c$ to be regularly updated.

The constant error $E_c$ thus determined is recorded in the memory of the wheel unit 11 and then used to correct the radial acceleration measurements on future radial acceleration measurements returned by the radial acceleration sensor 14. Such a correction is made in a way known per se, by subtracting the constant error $E_c$ from the newly acquired radial acceleration measurements.

FIG. 4 depicts one preferred embodiment of the method of FIG. 2 in which the method comprises a step 600 of estimating the error in the gain of said sensor 14.

It is known that the gain error (also known as the scaling error) corresponds to the error in the slope of the characteristic curve of the radial acceleration sensor 14. In other words, it is the difference between the signal measured by the radial acceleration sensor 14 and a theoretically expected signal. Also, with a view to improving the precision of the measurements taken by the radial acceleration sensor 14, it is appropriate to be able to estimate said gain error. Specifically, it is found that the current tolerance to design errors of a radial acceleration sensor 14 is becoming increasingly tight, given that measurement precision is becoming increasingly critical for achieving complex functions of the vehicle monitoring system, such as, for example, reliably locating a particular wheel that is experiencing a loss of pressure. Estimating an error in the gain of the radial acceleration sensor 14 therefore makes it possible, in addition to estimating the constant error $E_c$, to calibrate said sensor 14 even more effectively and more precisely.

As illustrated in FIG. 4, said step 600 is implemented after the detection step 300, and in parallel with said steps 400 to 500. For at least one time window $W_i$, an error $E_i$ in the gain of the radial acceleration sensor 14 is estimated using the formula:

$$R_i = V_i / Q_i,$$

where $V_i$ represents an amplitude associated with at least one local extremum of the signal $S_i$ acquired during said at least one time window $W_i$, and $Q_i$ represents an amplitude that is expected on the basis of measurements theoretically supplied by the radial acceleration sensor 14 for said at least one local extremum, the gain error $R_i$ being calculated only if a steady-speed phase is detected for the signal $S_i$.

The condition stipulating that step 600 be executed only if a steady-speed phase is detected in a time window $W_i$ is fundamentally associated with the fact that the profile of a signal $S_i$, in a diagram identical in nature to that of FIG. 3, is sinusoidal during such a steady-speed phase. In other words, the longitudinal component of the radial acceleration is zero.

For example, when a phase time signal $\varphi_i$ is determined as described hereinabove by quadratic interpolation for each time window $W_i$, the step 600 of estimating a gain error, which is then executed after step 300 of determining the frequencies $F_i$ in accordance with FIG. 4, involves making a comparison between the second derivative of said phase time signal $\varphi_i$ and a predetermined value $\varepsilon$, such that if $$|d^2\varphi_i/dt^2| < \varepsilon,$$

a steady-speed phase is detected. It will be appreciated that that amounts to checking whether the derivative of the frequency of rotation of the wheel 10 with respect to time is, in terms of absolute value, less than $\varepsilon/2\pi$. As an equivalent, this amounts also to checking whether the coefficient A of the degree two monomial of said quadratic interpolation is, in terms of absolute value, less than $\varepsilon/2\pi$.

As a preference, the predetermined value $\varepsilon$ is chosen from the interval [0.5, 1], for example equal to 0.6. The lower the chosen value $\varepsilon$, namely the closer it is to zero, the greater the equivalence between the condition to be met in order to detect a steady-speed phase and checking that the profile of a signal $S_i$ is sinusoidal, namely that the frequency of rotation of the wheel 10 is constant. Specifically, with reference for example to the analytical expression for A, it is found that as the value $\varepsilon$ tends toward 0, the condition for detecting a steady-speed phase becomes equivalent to determining whether the duration $t_2-t_1$ is tending toward becoming equal to the duration $t_1-t_0$. However, there is nothing to prevent the value of E being chosen from another interval the upper and lower limits of which are respectively greater than 0.5 and 1. The choice of the limits on said interval is dependent on the limit value for the longitudinal component of the radial acceleration that has been set in order to decide whether the vehicle is in a steady-speed phase.

It will therefore be appreciated that determining the frequencies $F_i$ is not a prerequisite essential to executing the step 600 of estimating the gain error. Thus, in an alternative embodiment (not depicted in the figures), step 600 is executed directly after the detection step 200, in parallel with steps 300 to 500. In such an alternative, the durations separating the instants of detection of the extrema are compared with one another, so that there is no need to determine the frequencies $F_i$ in order to detect a steady-speed phase.

The fact that the gain error $R_i$ associated with a time window $W_i$ is calculated only if a steady-speed phase is detected for the signal $S_i$ advantageously allows a measured amplitude to be compared against a theoretical amplitude for said signal $S_i$.

In one preferred embodiment, the amplitude $V_i$ corresponds to the amplitude between two consecutive local extrema of the signal $S_i$ in a steady-speed phase, and $Q_i$ satisfies:

$$Q_i = 2 \times g \times G,$$

where G represents the gain of a filter applied to the signal $S_i$ during the detection step 200 so as to reduce measurement noise. For example, and as already described hereinabove, when the signals $S_i$ are sampled and then filtered during the detection step 200 in order to remove the measurement aberrations, G is equal to the gain of the filter applied to the signals, which is a known item of data.

In other words, in this example it is a matter of comparing $V_i$, which corresponds to the peak-to-peak amplitude of the signal $S_i$, with the corresponding amplitude theoretically expected on the basis of knowledge of the gain G. It may be noted, with reference to FIG. 3, that said peak-to-peak amplitude corresponds to the amplitude between positions $C_1$ and $C_3$ when the profile of the signal Si is sinusoidal. The analytical expression for $Q_i$ is justified by the fact that, as explained before, the signal $S_i$ fluctuates about the mean component with an amplitude of between +g and −g, and modulated by the gain of the applied filter. The fact that $V_i$ corresponds to a peak-to-peak amplitude is advantageous because $V_i$ is then dependent solely on the gain error.

However, there is nothing to prevent a gain error R being calculated with other values of $V_i$ and $Q_i$. For example, according to another exemplary embodiment, $V_i$ represents an amplitude between a local extremum of the signal $S_i$ and the mean component of said signal $S_i$. $Q_i$ then satisfies:

$$Q_i = g \times G.$$

Nevertheless, it should be noted that in this other example, the amplitude $V_i$ is dependent not only on the gain error but also on the way in which the mean component of the signal $S_i$ is determined. In other words, if the value of R (as described above, R denotes the distance separating the axis of rotation of the wheel 10 from the radial acceleration sensor 14) is marred by an error, the value of $V_i$ relative to the corresponding value of $Q_i$ will also be marred by said error. Such an observation is also true if, for example, the estimate of the speed of rotation of the wheel 10 is erroneous.

Thus, at the end of step 600, each time window $W_i$ (and therefore each signal $S_i$) is associated with a gain error $R_i$. In this way, it is possible to determine whether the gain of the radial acceleration sensor 14 is drifting over the course of time.

The fact that the step 600 is executed after step 200, in parallel with steps 300 to 500, allows a saving of time in calibrating the radial acceleration sensor 14. However, there is nothing to prevent step 600 being performed after step 500.

In general, it should be noted that the embodiments considered hereinabove have been described by way of nonlimiting examples, and that other variants are therefore conceivable.

In particular, an aspect of the invention has been described considering the wheel unit 11 to operate in an autonomous manner, and for this purpose to comprise means suited to implementing each of the steps of the calibration method. However, there is nothing to prevent all or some of said steps, apart from the acquisition step 100, from being performed by the central unit with which the motor vehicle is equipped, or else again for example by computers positioned at a fixed station external to the vehicle and to which data (acquired signals, etc.) would be transmitted in the form of radio electric signals.

The invention claimed is:

1. A method for calibrating a radial acceleration sensor of a wheel of a motor vehicle, said method comprising:

an acquisition step of acquisition, by the radial acceleration sensor, of signals $S_i$, each signal $S_i$ being acquired during a predetermined time window $W_i$ when the motor vehicle is in motion, the windows $W_i$ being different from one another, a detection step of detecting, for each time window $W_i$, at least three local extrema of the signal $S_i$ which are respectively associated with phase values and with detection instants, a determination step of determining, for each time window $W_i$, a frequency $F_i$ of the rotation of the wheel of the motor vehicle as a function of the phase values and of the detection instants for the local extrema detected in said time window $W_i$, a filtering step of low-pass filtering of the signals $S_i$, so as to obtain, for each time window $W_i$, a filtered value $Z_i$ associated with the frequency $F_i$, and a calibration step of calibrating a constant error $E_c$ of the radial acceleration sensor as a function of the filtered values $Z_i$ and of the frequencies $F_i$.

2. The method as claimed in claim 1, wherein the step of determining the frequency $F_i$ comprises, for each time window $W_i$ considered, determining a phase time signal $\varphi_i$ by quadratic interpolation of the respective phase values of three local extrema, the frequency $F_i$ being determined by evaluating the derivative of said signal $\varphi_i$ with respect to time at a predetermined instant $t_p$ within said time window $W_i$.

3. The method as claimed in claim 2, wherein the three local extrema considered within each time window $W_i$ are consecutive.

4. The method as claimed in claim 1, wherein the cut-off frequency of the low-pass filter applied to the signals $S_i$ is less than or equal to 10 Hz, preferably less than 5 Hz, and more preferably still equal to 1 Hz.

5. The method as claimed in claim 1, wherein the step of calibrating the constant error $E_c$ comprises a linear regression of points $P_i$, each point $P_i$ having $Z_i$ and $F_i^2$ as its ordinate and abscissa values respectively, the constant error $E_c$ being estimated to be equal to the ordinate value at the origin of said linear regression.

6. The method as claimed in claim 1, said method comprising, after the detection step, a step 600 of estimating, for at least one time window $W_i$, an error $R_i$ in the gain of the radial acceleration sensor according to the formula: $R_i = V_i/Q_i$, where $V_i$ represents an amplitude associated with at least one local extremum of the signal $S_i$ acquired during said at least one time window $W_i$, and $Q_i$ represents an amplitude that is expected on the basis of measurements theoretically supplied by the radial acceleration sensor for said at least one local extremum, the gain error $R_i$ being calculated only if a steady-speed phase is detected for the signal $S_i$.

7. The method as claimed in claim 6, wherein, the step of determining the frequency $F_i$ comprises, for each time window $W_i$ considered, determining a phase time signal $\varphi_i$ by quadratic interpolation of the respective phase values of three local extrema, the frequency $F_i$ being determined by evaluating the derivative of said signal $\varphi_i$ with respect to time at a predetermined instant $t_p$ within said time window $W_i$, and the step of estimating a gain error comprises, for each time window $W_i$, making the comparison between the second derivative of the phase time signal $\varphi_i$ and a predetermined value $\varepsilon$, such that if $|d^2\varphi_i/dt^2|<\varepsilon$, a steady-speed phase is detected.

8. The method as claimed in claim 7, wherein the amplitude $V_i$ corresponds to the amplitude between two consecutive local extrema of the signal $S_i$ in a steady-speed phase, and $Q_i$ satisfies:

$$Q_i = 2 \times g \times G,$$

where g is the acceleration due to gravity, and G represents the gain of a filter applied to the signal $S_i$ during the detection step so as to reduce measurement noise.

9. The method as claimed in claim 6, wherein the amplitude $V_i$ corresponds to the amplitude between two consecutive local extrema of the signal $S_i$ in a steady-speed phase, and $Q_i$ satisfies:

$$Q_i = 2 \times g \times G,$$

where g is the acceleration due to gravity, and G represents the gain of a filter applied to the signal $S_i$ during the detection step so as to reduce measurement noise.

10. A wheel unit comprising a radial acceleration sensor, said wheel unit comprising means configured for implementing the steps of the calibration method as claimed in claim 1 so as to calibrate said radial acceleration sensor.

11. A motor vehicle comprising a wheel unit as claimed in claim 10.

* * * * *

UNITED STATES PATENT AND TRADEMARK OFFICE
CERTIFICATE OF CORRECTION

| | | |
|---|---|---|
| PATENT NO. | : 11,428,709 B2 | Page 1 of 1 |
| APPLICATION NO. | : 17/264138 | |
| DATED | : August 30, 2022 | |
| INVENTOR(S) | : Nicolas Guinart et al. | |

It is certified that error appears in the above-identified patent and that said Letters Patent is hereby corrected as shown below:

In the Claims

Column 17, Line 13, Claim 1 "Instants" should be -- instants --.

Signed and Sealed this
Twenty-fifth Day of October, 2022

Katherine Kelly Vidal
*Director of the United States Patent and Trademark Office*